United States Patent
Zhou et al.

(10) Patent No.: US 9,097,928 B2
(45) Date of Patent: Aug. 4, 2015

(54) CAPACITIVE TOUCH PANEL AND DISPLAY DEVICE

(71) Applicant: Shanghai Tianma Micro-Electronics Co., Ltd., Shanghai (CN)

(72) Inventors: Xingyao Zhou, Shanghai (CN); Qijun Yao, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 78 days.

(21) Appl. No.: 14/092,160

(22) Filed: Nov. 27, 2013

(65) Prior Publication Data

US 2014/0092326 A1 Apr. 3, 2014

Related U.S. Application Data

(63) Continuation-in-part of application No. PCT/CN2012/084252, filed on Nov. 7, 2012.

(30) Foreign Application Priority Data

Sep. 19, 2012 (CN) .......................... 2012 1 0350298

(51) Int. Cl.
*G02F 1/1335* (2006.01)
*G02F 1/1333* (2006.01)
*G06F 3/041* (2006.01)
*G06F 3/044* (2006.01)

(52) U.S. Cl.
CPC ...... *G02F 1/13338* (2013.01); *G02F 1/133512* (2013.01); *G06F 3/044* (2013.01); *G06F 3/0412* (2013.01)

(58) Field of Classification Search
CPC .................. G02F 1/13338; G02F 2001/13312; G02F 1/133514; G02F 1/133512; G02F 1/133516; G02F 1/136209; G02F 2001/133388; G06F 3/0412; G06F 3/045; G06F 3/044
USPC ............................................. 349/12, 106, 110
See application file for complete search history.

(56) References Cited

U.S. PATENT DOCUMENTS

2012/0062486 A1* 3/2012 Rho .............................. 345/173
2012/0105337 A1* 5/2012 Jun et al. ....................... 345/173

FOREIGN PATENT DOCUMENTS

CN 102207644 A 10/2011
CN 102466907 A 5/2012

* cited by examiner

*Primary Examiner* — Mike Qi
(74) *Attorney, Agent, or Firm* — Kilpatrick Townsend & Stockton LLP

(57) ABSTRACT

A capacitive touch panel is disclosed. The touch panel includes a substrate, and a black matrix formed on the substrate, where the black matrix includes a plurality of light-permeable regions. The touch panel also includes a plurality of color units each aligned with one of the light-permeable regions of the black matrix in a light permeation direction, where each of the color units includes a color resistor of one of a plurality of colors, and at least one transparent conductive layer includes a plurality of slots, where the slots of the transparent conductive layer are aligned with the color units of the same color in the light permeation direction.

20 Claims, 7 Drawing Sheets

US 9,097,928 B2

CAPACITIVE TOUCH PANEL AND DISPLAY DEVICE

CROSS-REFERENCES TO RELATED APPLICATIONS

This application claims priority to and is a continuation in part of PCT/CN2012/084252, filed on Nov. 7, 2012, and entitled "IN-CELL CAPACITIVE TOUCH PANEL, DISPLAY DEVICE AND MANUFACTURING METHOD THEREOF", which application claims the benefit of Chinese Patent Application No. 201210350298.x, filed with the Chinese Patent Office on Sep. 19, 2012, and entitled "IN-CELL CAPACITIVE TOUCH PANEL, DISPLAY DEVICE AND MANUFACTURING METHOD THEREOF", the contents of which are incorporated herein by reference in their entirety.

BACKGROUND OF THE INVENTION

1. Technical Field

The present invention relates to the field of touch display technologies, and in particular to a capacitive touch panel and a touch display device.

2. Technical Background

A touch screen built in a Liquid Crystal Display (LCD) device can be integrated with a Color Filter (CF) substrate together to reduce a thickness of a display device and to simplify the manufacturing process of the display device effectively, and hence is pursued greatly by manufacturers. As shown in FIGS. 1 and 2, an In-Cell touch panel includes a CF substrate 10, a black matrix 11, a touch layer 12 (comprising a metal grid 121, a transparent conductive layer 122, a first insulation layer 123 and a metal bridge 124), color resistors (R, G, B) 13, a second insulation layer 14, a Thin Film Transistor substrate (TFT substrate) 20, a circuit electrode 21 on the TFT substrate 20, and a liquid crystal layer 30. The black matrix 11 located on the CF substrate 10 is provided with a plurality of light-permeable regions. Driving lines and sensing lines provided on the touch layer 12 are arranged to intersect with each other, and a touch signal is generated when intersections between the driving lines and the sensing lines are touched by a user's finger. The color resistors 13 located on the touch layer 12 cover the light-permeable regions of the black matrix 11, and the second insulation layer 14 is located on the color resistors 13.

As shown in FIG. 2, the driving lines and touching lines of the touch layer are included in the metal grid 121 and the transparent conductive layer 122 in the structure of the In-Cell touch panel described above, where the metal grid 121 is designed to be invisibly shielded by the black matrix. However, slots of the pattern of the transparent conductive layer 122 may be observed by a person's eyes because such slots are arranged at a region in which a pixel is present (i.e. the light-permeable region). There exists a difference in transmittance of light penetrating regions with and without the transparent conductive layer 122, and such difference may be observed by the person's eyes. Since the light transmittances vary with light wavelengths (as shown in FIG. 3), the appearance of the slots of the transparent conductive layer 122 observed in the case of R, G and B pictures are different from each other.

BRIEF SUMMARY OF THE INVENTION

One inventive aspect is a capacitive touch panel, including a substrate, and a black matrix formed on the substrate, where the black matrix includes a plurality of light-permeable regions. The touch panel also includes a plurality of color units each aligned with one of the light-permeable regions of the black matrix in a light permeation direction, where each of the color units includes a color resistor of one of a plurality of colors, and at least one transparent conductive layer includes a plurality of slots, where the slots of the transparent conductive layer are aligned with the color units of the same color in the light permeation direction.

Another inventive aspect is a capacitive touch display device, including a touch panel. The touch panel includes a substrate, and a black matrix formed on the substrate, where the black matrix includes a plurality of light-permeable regions. The touch panel also includes a plurality of color units each aligned with one of the light-permeable regions of the black matrix in a light permeation direction, where each of the color units includes a color resistor of one of a plurality of colors, and at least one transparent conductive layer includes a plurality of slots, where the slots of the transparent conductive layer are aligned with the color units of the same color in the light permeation direction. The display device also includes an array substrate, which is arranged opposite to the touch panel, and a display layer disposed between the touch panel and the array substrate.

DETAILED DESCRIPTION OF THE INVENTION

The embodiments of the present invention are described in conjunction with the accompanying drawings so as to make various objects and characteristics of the present invention more apparent, but various variations may be made to the present invention and the invention is not intended to be limited to the disclosed embodiments.

A First Embodiment

Figure 1:
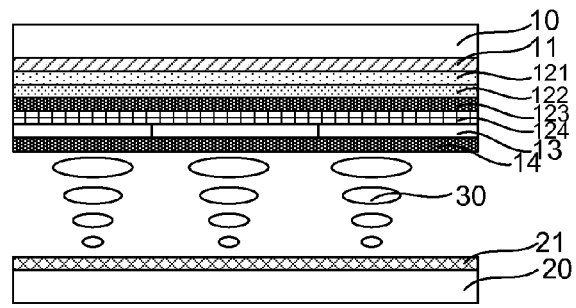
FIG. 1 is a schematic view showing the cross sectional structure of an In-Cell capacitive touch display device in the prior art.
Figure 2:
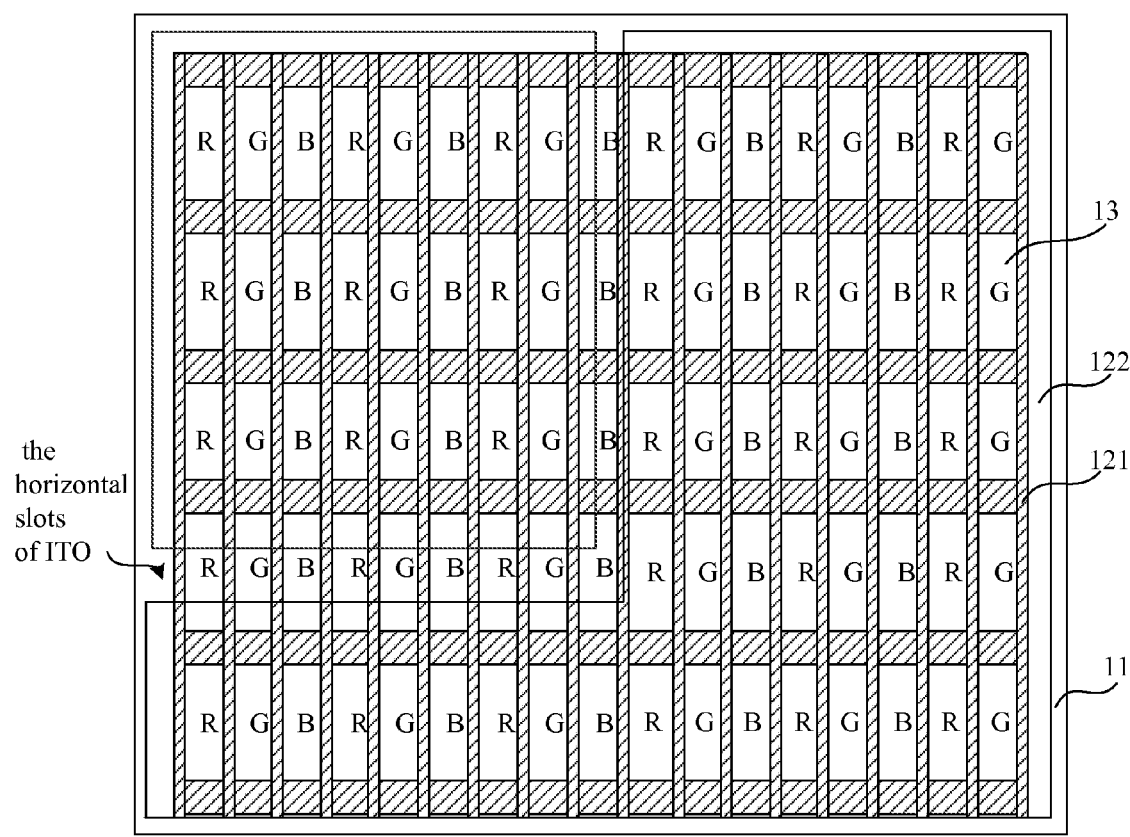
FIG. 2 is a schematic view of an In-Cell capacitive touch panel with a transparent conductive layer formed by ITO in the prior art.
Figure 3:
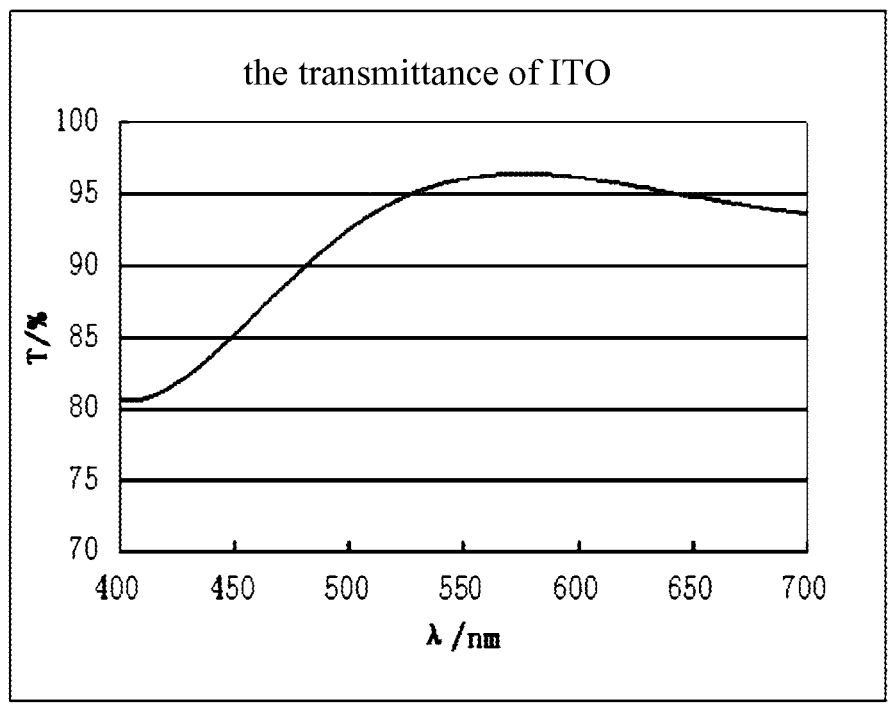
FIG. 3 is a graph showing light transmittance versus light wavelengths with respect to a transparent conductive layer formed by ITO in the prior art.
Figure 4:
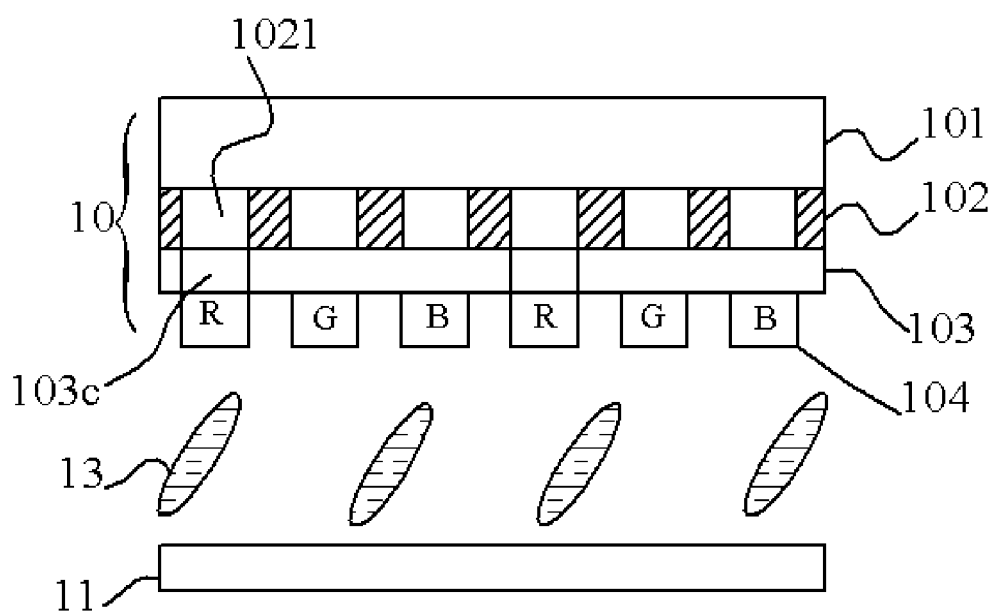
FIG. 4 is a schematic cross sectional view of a capacitive touch display device according to a first embodiment of the present invention.

FIG. 4 is a schematic sectional view of a capacitive touch display device according to a first embodiment of the present invention. As shown in FIG. 4, the capacitive touch display device includes a touch panel 10, an array substrate 11, and a display layer 13 disposed between the touch panel 10 and the array substrate 11. The display layer can be a liquid crystal layer, an organic light-emitting layer, or formed by other materials. The display layer 13 is described as a liquid crystal layer, for example, in the first embodiment. A pixel unit array (Not shown) is provided at an internal side of the array substrate 11 toward the touch panel 10.

The touch panel 10 sequentially includes a substrate 101, a black matrix 102 arranged at an internal side of the substrate 101, a transparent conductive layer 103, and a color unit layer 104. The black matrix 102 is provided with a plurality of light-permeable regions 1021, the color unit layer 104 includes a plurality of color resistors of some colors, in particular R color resistors, G color resistors, B color resistors and W color resistors. Here, the first embodiment is described by taking R color resistors, G color resistors and B color resistors as an example, and the color resistors of various colors cover the light-permeable regions 1021 of the black matrix 102 according to a certain arrangement rule. Particularly, the R color resistors, G color resistors and B color resistors are respectively arranged in a plurality of columns in a column direction and are arranged alternately in a row direction in the first embodiment.

Figure 5:
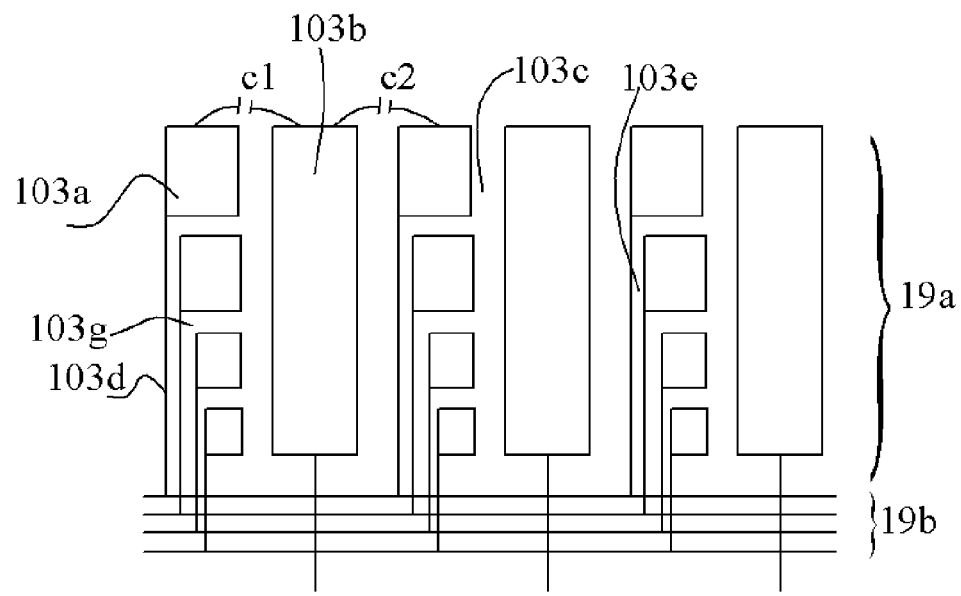
FIG. 5 is a schematic view showing the structure of the transparent conductive layer.

The transparent conductive layer 103 is used to form a touch structure. In the first embodiment, the touch structure is a single-layered mutual-capacitive touch structure. As shown in FIG. 5 which is a schematic view showing the structure of the transparent conductive layer, the touch structure includes a plurality of driving electrodes 103a and a plurality of sensing electrodes 103b, and the mutual-capacitance formed between the driving electrodes 103a and sensing electrodes 103b is used to detect a touch action. Particularly, the driving electrodes 103a are arranged in a matrix form in a working area 19a, each sensing electrode 103b is disposed between two columns of driving electrodes 103a, and the driving electrodes 103a are connected to driving signals respectively in a peripheral area 19b. In the working area 19a, the mutual-capacitance is formed by each of the driving electrodes 103a and the sensing electrode 103b as well as an insulation medium therebetween. For example, a capacitance C1 and a capacitance C2 as shown in FIG. 5 are mutual-capacitances respectively formed between the driving electrode 103a and the adjacent sensing electrodes 103b located at both sides of the driving electrode 103a. A change of the mutual-capacitance occurs when a touch action takes place in a region with the driving electrodes 103a and the sensing electrodes 103b forming the capacitance C1, so that a touch position may be detected.

The transparent conductive layer 103 further includes a plurality of slots 103c arranged along a vertical direction. Since the driving electrodes 103a and the sensing electrodes 103b are formed by etching the same transparent conductive layer 103, the slots 103c are necessarily disposed between and insulate the adjacent electrodes. Meanwhile, both the driving electrodes 103a and the sensing electrodes 103b are connected to external driving signals through leading lines, for example, the driving electrodes 103a are connected to the driving signals through leading lines 103d formed by etching the transparent conductive layer 103, and the leading lines 103d are insulated from other leading lines and the driving electrodes or the sensing electrodes, thus slots 103e are necessarily arranged to insulate the leading lines from other parts.

Figure 6:
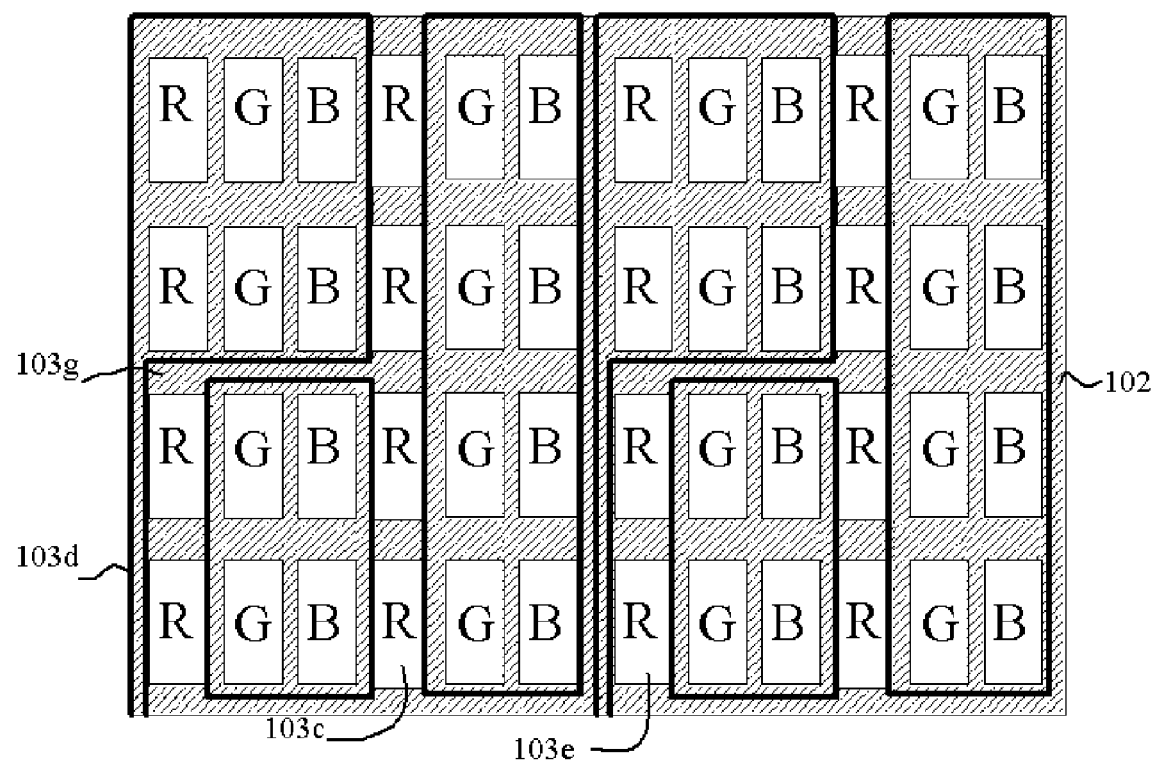
FIG. 6 is a schematic partial enlarged view of FIG. 5.

Referring to FIG. 6 which is a schematic partial enlarged view of FIG. 5 and shows the schematic position relationship among the transparent conductive layer 103, the black matrix 102 and the color unit layer 104. As shown in FIG. 6, the color unit layer 104 includes three kinds of color resistors of a red color (R), a green color (G) and a blue color (B), respectively. The R, G and B color resistors are arranged alternately in a horizontal direction, with the color resistors of the same color being arranged in a vertical direction, that is, a column of R color resistors, a column of G color resistors and a column of B color resistors are arranged sequentially and are repeated. Both the slots 103c and the slots 103e are overlapped with the color resistors of the same color in the light permeation direction, for example, both of the slots 103c and the slots 103e are overlapped with the R color resistors in the first embodiment. In this case, since none of the G color resistors and the B color resistors is overlapped with the slots, the light transmittances of the regions for the G color resistors and the B color resistors are uniform, thereby improving the display effect as compared with the prior art.

Figure 7:
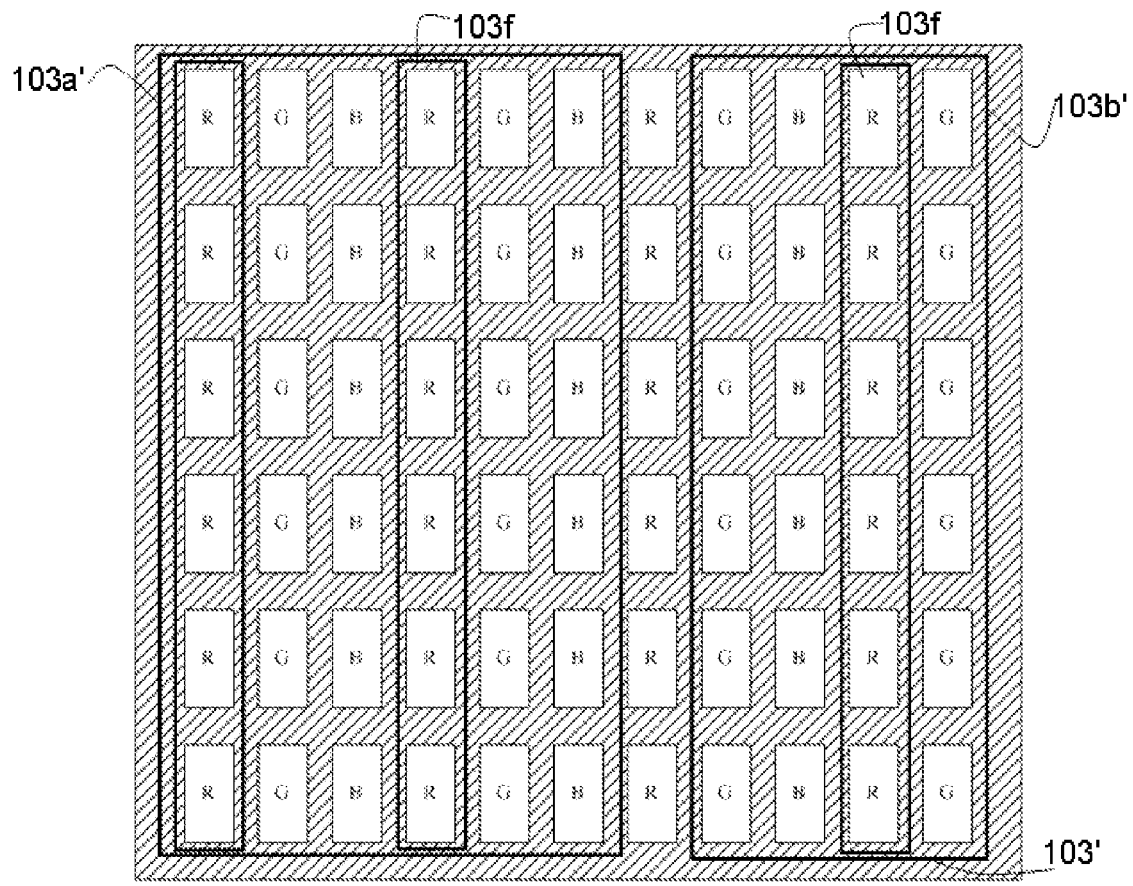
FIG. 7 is a schematic view of another implementation in the first embodiment.

FIG. 7 is a schematic view of another implementation in the first embodiment. Preferably, in a region with driving electrodes 103a' and sensing electrodes 103b', a slot 103f is provided in a transparent conductive layer 103' corresponding to each of the R color resistors in a light permeation direction. That is, the light transmittance of the R color resistor is the same as the light transmittance between the driving electrodes and the sensing electrodes within the entire region with the driving electrodes 103a' and the sensing electrodes 103b', such that the display effect is more uniform.

Further, at positions other than those as described above, a slot is provided in the transparent conductive layer corresponding to each of the R color resistors in the light permeation direction, i.e., a slot is provided at each of the positions overlapping with the R color resistors within the entire transparent conductive layer, and the light transmittances of all the R color resistors are identical, such that the light transmittance in the entire display interface is uniform, thereby solving the technical problem of non-uniformity of the light transmittance caused by the transparent conductive layer in the prior art.

In the other implementations, the transparent conductive layer may be provided on the external side of the color filter substrate, thus forming an On-Cell capacitive touch display device, which can also attain the same technical effect.

Referring to FIG. 6 again, slots 103g are further disposed between the adjacent driving electrodes 103a along a horizontal direction, and the slots 103g are arranged to overlap with the horizontal portion of the black matrix 102 in the light permeation direction. In this way, the horizontal slots are hidden below the black matrix 102, such that the light transmittance of the display device is uniform, thereby improving the display effect.

In the first embodiment, a line width of the horizontal portion of the black matrix 102 ranges from 24.5 μm to 26.5 μm. A line width of the horizontal slots 103g of the transparent conductive layer 103 can be designed to be 10% to 90% of the line width of the horizontal portion of the black matrix 102 or can be designed to be 3 μm to 22 μm directly.

A line width of a vertical portion of the black matrix 102 ranges from 7.0 μm to 8.0 μm. The vertical slots of the transparent conductive layer 103, e.g. the slots 103c and the slots 103e, each have a minimum line width equal to a width of one color unit, and have a maximum value which is equal to the width of one color unit plus a line width of the light-impermeable regions of the black matrix 102 in the vertical direction on both sides of the color unit, such as 33.5 µm to 38.5 µm.

In the first embodiment, the color unit is a colored color resistor. Generally, it is necessary for the liquid crystal display device to be combined with the color filter plate to form colored pictures. In other implementations, the color unit may be an organic light-emitting display unit, which generally is provided on an array unit. In the light permeation direction, the same technical effect can also be achieved by overlapping the slots between the driving electrodes and the sensing electrodes and the slots inside the driving or sensing electrodes with the organic light-emitting display units of the same color.

In the first embodiment, the transparent conductive layer is made of an Indium Tin Oxide (ITO). In other implementations, the transparent conductive layer may be made of an Indium Zinc Oxide (IZO), a Carbon Nano-Tube (CNT) or an Al—Ti co-doped zinc oxide and so on.

A Second Embodiment

Figure 8:
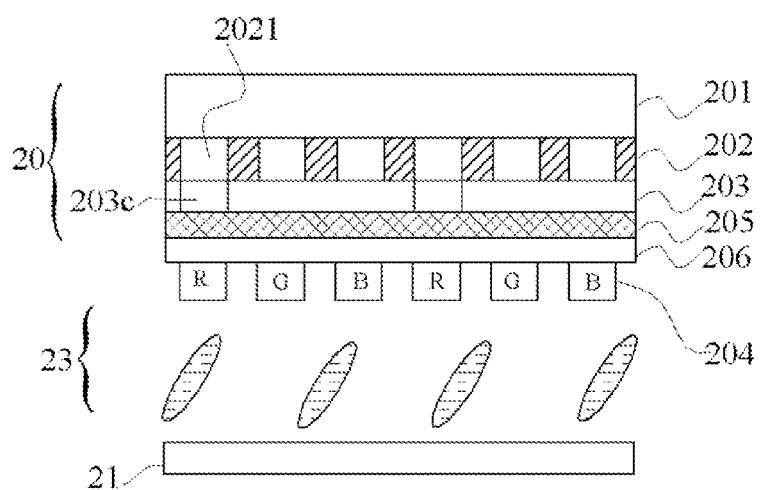
FIG. 8 is a schematic cross sectional view of a capacitive touch display device according to a second embodiment of the present invention.

FIG. 8 is a schematic sectional view of a capacitive touch display device according to a second embodiment. As shown in FIG. 8, the capacitive touch display device includes a touch panel 20, an array substrate 21, and a display layer 23 disposed between the touch panel 20 and the array substrate 21. The display layer 23 is a liquid crystal layer in the second embodiment. A pixel unit array is provided on an internal side of the array substrate 21 toward the touch panel 20.

The touch panel 20 sequentially includes a substrate 201, a black matrix 202 arranged at the internal side of the substrate 201, a transparent conductive layer 203, an insulation layer 205, a metal bridge layer 206 and a color unit layer 204. The black matrix 202 is provided with a plurality of light-permeable regions 2021, and the color unit layer 204 includes color resistors of a plurality of colors. In the light permeation direction, the color resistors of a plurality of colors are disposed at a certain rule and are arranged corresponding to the light-permeable regions 2021 of the black matrix 202.

Figure 9:
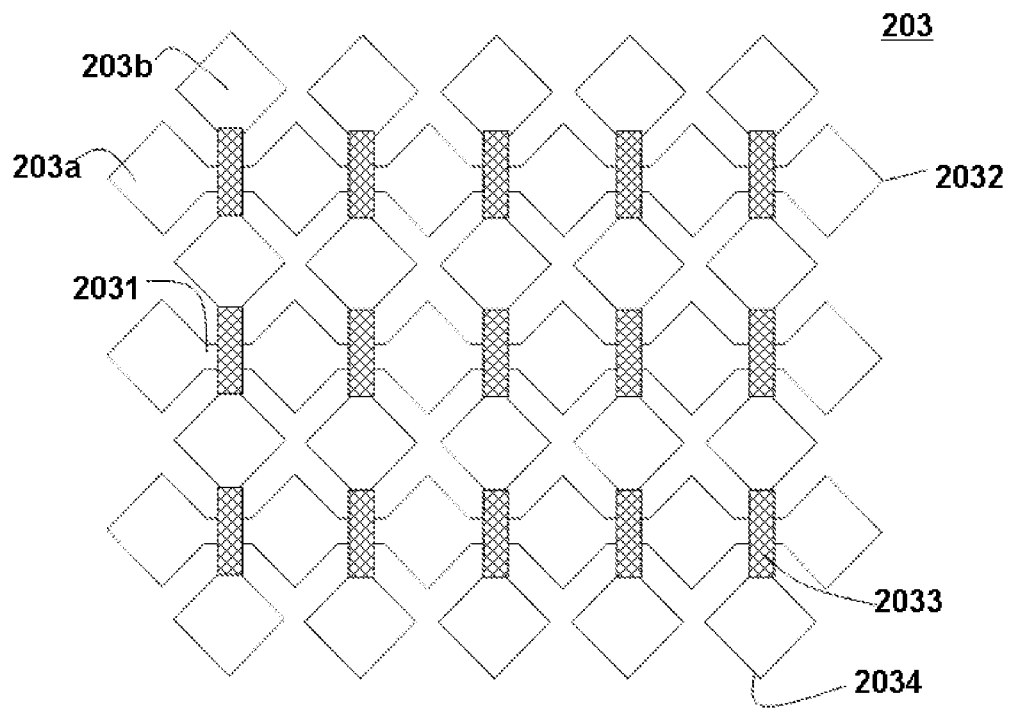
FIG. 9 is a schematic view of the touch structure according to the second embodiment of the present invention.

The transparent conductive layer 203, the insulation layer 205 and the metal bridge layer 206 are used to form a touch structure. In the second embodiment, the touch structure is a double-layered mutual-capacitive touch structure. Particularly, as shown in FIG. 9, the touch structure includes a plurality of diamond driving electrodes 203a and a plurality of sensing electrodes 203b, and each of the driving electrodes 203a and the sensing electrodes 203b is formed by etching the transparent conductive layer 203. In the row direction, the plurality of driving electrodes 203a are connected together with each other through first bridges 2031 located at the transparent conductive layer 203 to form a plurality of driving lines 2032, and in the column direction, the plurality of sensing electrodes 203b are connected with each other through first bridges 2033 located at the metal bridge layer 206 to form a plurality of sensing lines 2034.

Figure 10:
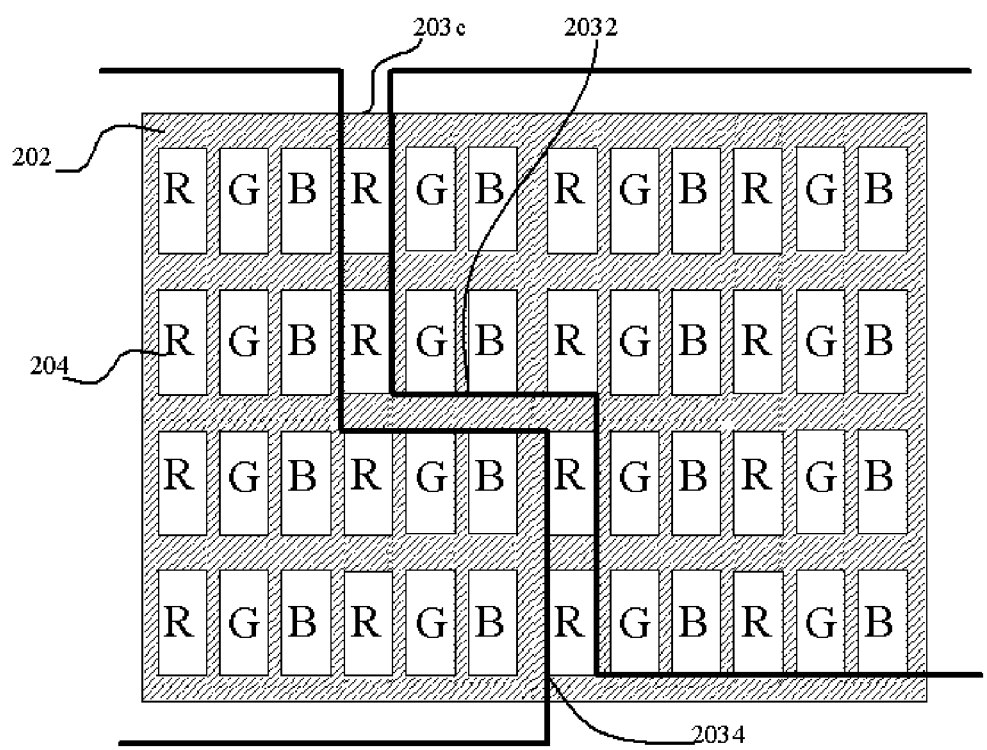
FIG. 10 is a schematic enlarged view of the partial structure of FIG. 9.

Slots 203c are disposed between and insulate the driving electrodes 203a and the sensing electrodes 203b. Referring to FIG. 10, which is a schematic enlarged view of the partial structure of FIG. 9 and shows the schematic position relationship among the transparent conductive layer 203, the black matrix 202 and the color unit layer 204. The color unit layer 204 includes R, G, and B color resistors. In a horizontal direction, the R, G and B color resistors are arranged sequentially, but color resistors of the same color are arranged in the vertical direction.

In a light permeation direction, a horizontal portion of the slot 203c of the transparent conductive layer 203 is invisible since it is overlapped with a light-impermeable region of the black matrix 202, without impacting the display effect. The vertical portion of the slot 203c is overlapped with the R color resistor, but neither of the B color resistor and the G color resistor is overlapped with any slot, thus light transmittances of the display regions for the B and G color resistors are uniform, thereby improving the display effect as compared with the prior art.

Further, in a region with the driving electrodes and the sensing electrodes, a slot is provided in the transparent conductive layer corresponding to each of the R color resistors in the light permeation direction. That is, the light transmittance inside the entire region with the driving electrodes and the sensing electrodes is the same as the light transmittance between the driving electrodes and the sensing electrodes, such that the display effect is more uniform.

Further, at positions other than those inside the driving electrodes, inside the sensing electrodes, and between the driving electrodes and the sensing electrodes, a slot is provided in the transparent conductive layer corresponding to each of the R color resistors in the light permeation direction, that is, the slots are provided at any positions overlapping with the R color resistors within the entire transparent conductive layer, and the light transmittances of all the R color resistors are identical, thus the light transmittance in the entire display interface is uniform, thereby solving the technical problem of non-uniformity of the light transmittance caused by the transparent conductive layer in the prior art.

Preferably, the slots of the transparent conductive layer are not overlapped with the G color resistors in the light permeation direction. Since a person's eyes are most sensitive to a green color, the light transmittance of the G color resistor is higher than that of the B color resistor and that of the R color resistor. If the G color resistors are arranged to overlap with the slots, it is necessary for the B color resistors and the R color resistors to overlap with regions of the transparent conductive layer other than the slots, resulting in decreasing the light transmittances of the B color resistors and the R color resistors. However, if the G color resistors are overlapped with the regions of the transparent conductive layer other than the slots, there is no obvious influence on the light transmittance of the G color resistors.

In the second embodiment, dummy electrodes are disposed between the adjacent driving lines 2032 or between the adjacent sensing lines 2034, and slots are arranged between the dummy electrodes and the driving electrodes 203a as well as the sensing electrodes 203b for insulating. Slots are also provided inside the dummy electrodes and overlapped with the R color resistors in the light permeation direction, and the regions of the dummy electrodes other than the slots are overlapped with B color resistors and G color resistors.

Figure 11:
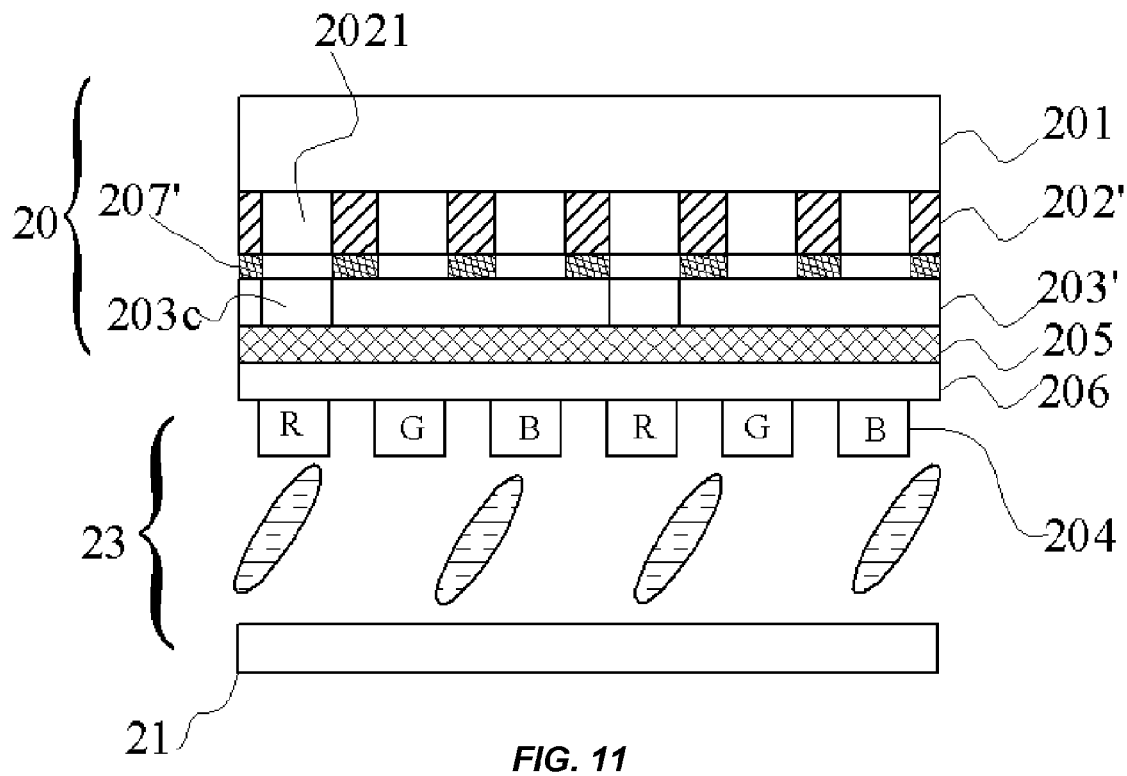
FIG. 11 is a schematic cross sectional view of another implementation in the second embodiment.

FIG. 11 is a schematic view of another implementation in the second embodiment. As shown in FIG. 11, a metal grid layer 207' is further disposed between a transparent conductive layer 203' and a black matrix 202', and is electrically connected to the transparent conductive layer 203' through a direct contact. The metal grid layer 207' further includes a plurality of diamond electrodes, the hollow parts of which are overlapped with the color units, and the non-hollow parts of which are overlapped with light-impermeable regions of the black matrix 202', and the arranged plurality of diamond electrodes correspond to the driving electrodes and the sensing electrodes, respectively, that is, the edge shape of the diamond electrode is consistent with or similar to that of the driving electrode and that of the sensing electrode. Actually, in another implementation of the second embodiment, the driving electrodes and the sensing electrodes each have a double-layered structure, which includes a metal gird layer 207' and a transparent conductive layer 203'. The transparent conductive layer 203' is typically made of metallic oxides with a high resistance, hence the metal gird layer 207' is arranged to decrease the resistance of the touch structure, thereby reducing the power consumption.

In the other implementations, the color filter substrate sequentially includes a substrate, a black matrix arranged at an internal side of the substrate, a transparent conductive layer, a color unit layer, and a metal bridge layer. An insulation layer is omitted in the other implementations compared with the above second embodiment, instead, the color unit layer is used as an insulation layer disposed between the transparent conductive layer and the metal bridge layer, such that the thickness of the device is smaller and the integration level is higher.

A Third Embodiment

Figure 12:
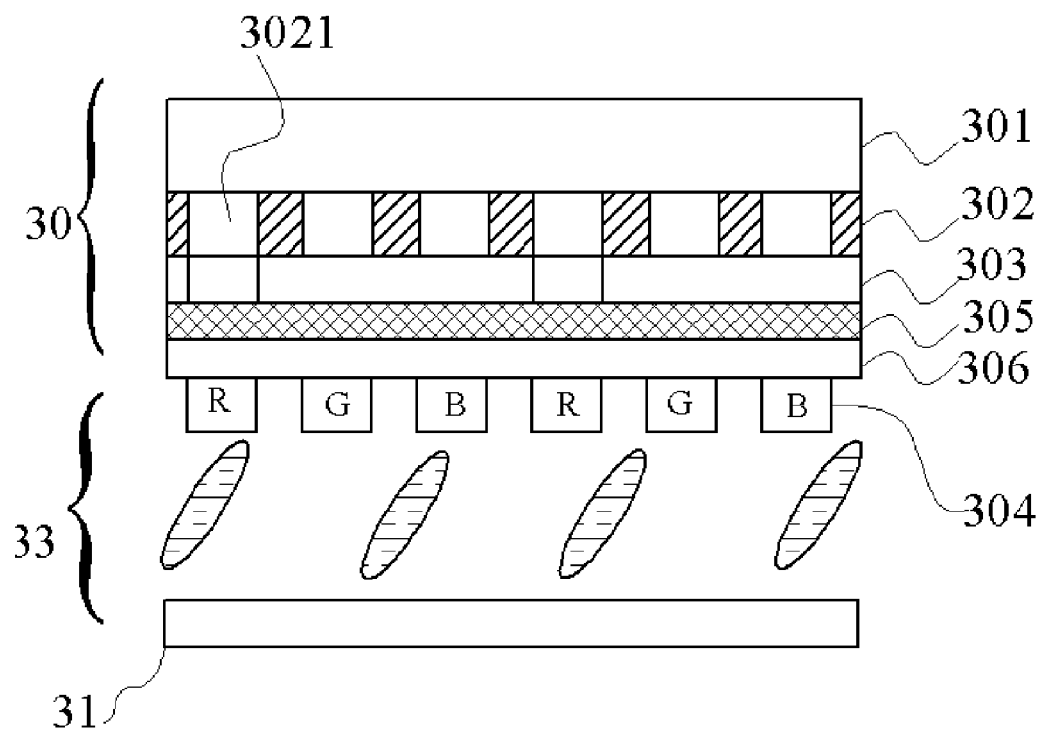
FIG. 12 is a schematic cross sectional view of a capacitive touch display device according to a third embodiment of the present invention.

FIG. 12 is a schematic view of a capacitive touch display device according to the third embodiment of the present invention. As shown in FIG. 12, a capacitive touch display device includes a touch panel 30, an array substrate 31, and a display layer 33 disposed between the touch panel 30 and the array substrate 31. A pixel unit array is provided on an internal side of the array substrate 33 toward the touch panel 30.

The touch panel 30 sequentially includes a substrate 301, a black matrix 302, a first transparent conductive layer 303, an insulation layer 306, a second transparent conductive layer 305, and a color unit layer 304. The black matrix 302 is provided with a plurality of light-permeable regions 3021. The color unit layer 304 includes a plurality of color resistors of different colors, particularly, R color resistors, G color resistors and B color resistors, and the plurality of color resistors cover the light-permeable regions 3021 of the black matrix 302 according to a certain arrangement rule. Particularly, the R color resistors, the G color resistors and the B color resistors are respectively arranged in columns in a column direction, and are arranged alternately in a row direction.

Figure 13:
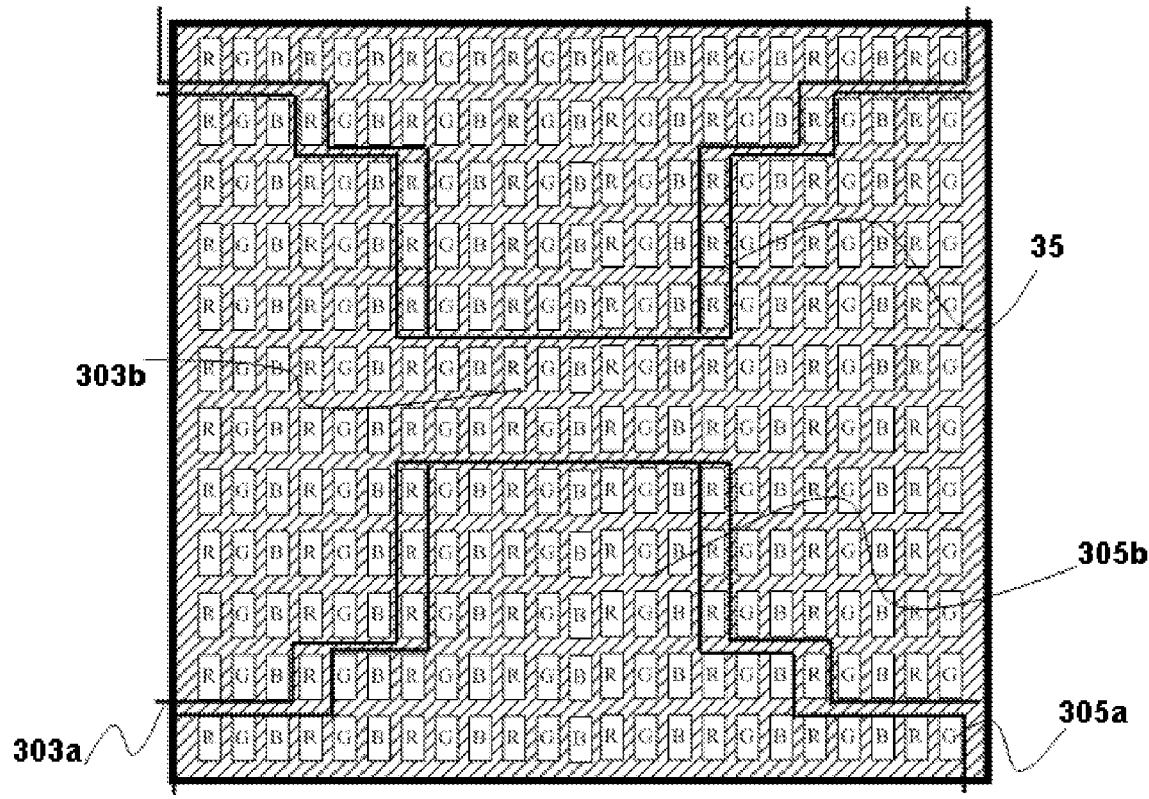
FIG. 13 is a top view of the touch structure of the third embodiment of the present invention.

FIG. 13 is a top view of a touch structure of the third embodiment. As shown in FIG. 13, the first transparent conductive layer 303 includes a plurality of driving electrodes 303a and a plurality of first bridges 303b, where the plurality of driving electrodes 303a are connected by the plurality of first bridges 303b to form a plurality of driving lines extended along in a horizontal direction. The second transparent conductive layer 305 includes a plurality of sensing electrodes 305a and a plurality of second bridges 305b, where the plurality of sensing electrodes 305a are connected by the plurality of second bridges 305b to form a plurality of sensing lines extended along in a vertical direction. Slots 35 disposed between the driving electrodes 303a and the sensing electrodes 305a are overlapped with the R color resistors in a light permeation direction.

Particularly, the vertical portions of the slots 35 are overlapped with the R color resistors, and the horizontal portions of the slots 35 are overlapped with the horizontal portions of the black matrix 302. Although the first transparent conductive layer 303 and the second transparent conductive layer 305 are not located at the same layer, the slots 35 are provided between electrodes at the first transparent conductive layer 303 and electrodes at the second transparent conductive layer 305 in the light permeation direction, and the light transmittance at the slots 35 is different from that at the electrodes. The horizontal portions of the slots 35 are shielded by the black matrix 302 in the light permeation direction and thus will not cause any influence to the display effect. The vertical portions of the slots 35 are arranged to overlap with the R color resistors in the light permeation direction. All the B color resistors and G color resistors are not overlapped with the slots 35 in the light permeation direction, and hence have the same light transmittance, thereby improving the display uniformity.

Further, inside the driving electrodes 303a, the first bridge 303b, the sensing electrodes 305a and the second bridge 305b, slots are provided in the first transparent conductive layer 303 and the second transparent conductive layer 305 corresponding to each of the R color resistors in the light permeation direction. Further, at positions other than those as described above, slots are provided in the first transparent conductive layer 303 and the second transparent conductive layer 305 corresponding to each of the R color resistors in the light permeation direction. In the entire display surface, since the slots are provided in the first transparent conductive layer 303 and the second transparent conductive layer 305 corresponding to each of the R color resistors, the light transmittances of all the R color resistors are identical, and the display effect is more uniform.

In the other implementations, the first transparent conductive layer and the second transparent conductive layer are located at the internal side or external side of the color filter substrate and the array substrate, respectively, and the same technical effect can be obtained only if the slots disposed between the first transparent conductive layer and the second transparent conductive layer are overlapped with the color units of the same color.

A Fourth Embodiment

Figure 14:
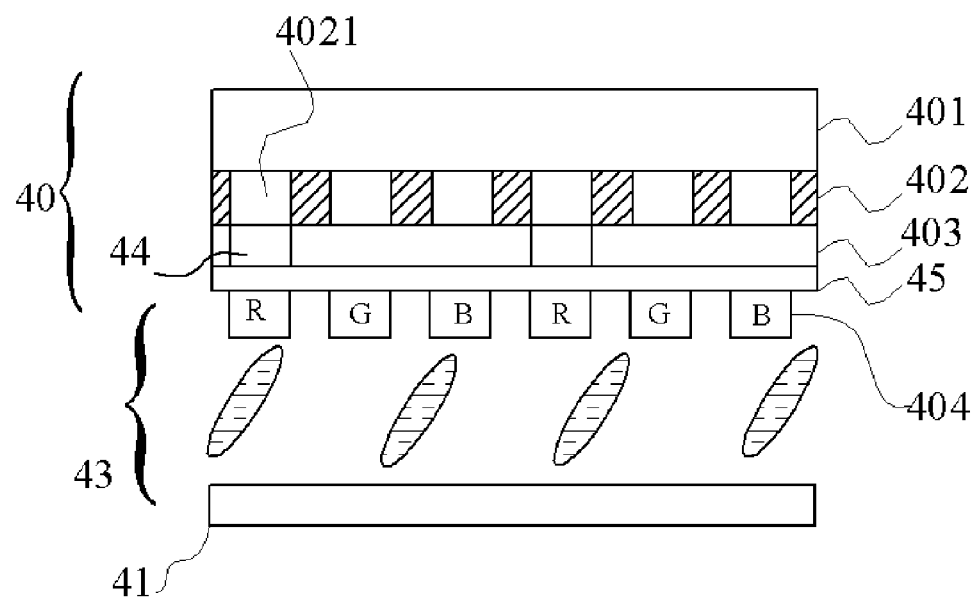
FIG. 14 is a cross sectional view of a capacitive touch display device according to a fourth embodiment of the present invention.

FIG. 14 is a sectional view of a capacitive touch display device provided by the fourth embodiment. As shown in FIG. 14, the capacitive touch display device includes a touch panel 40, an array substrate 42, and a display layer 43 disposed between the touch panel 40 and the array substrate 42.

The touch panel 40 sequentially includes a substrate 401, a black matrix 402 arranged at an internal side of the substrate 401, a transparent conductive layer 403 and a color unit layer 404. A plurality of light-permeable regions 4021 are provided in the black matrix 402, the color unit layer 404 includes a plurality of color resistors of different colors, particularly R color resistors, G color resistors, and B color resistors, and the plurality of color resistors cover the light-permeable regions 4021 of the black matrix 402 according to a certain arrangement rule.

The transparent conductive layer 403 includes a plurality of driving electrodes and sensing electrodes. Slots 44 are disposed between the driving electrodes and the sensing electrodes and are overlapped with color units of the same color in the light permeation direction, for example, the slots 44 are arranged to overlap with the R color resistors in the fourth embodiment.

The fourth embodiment is different from the first embodiment in that, a transparent insulation layer is further provided inside the slots 44. Due to the slots 44 arranged between the driving electrodes and the sensing electrodes, the light transmittance of the R color resistors at the slots 44 is different from that at the transparent conductive layer 403 corresponding to the driving electrodes or the sensing electrodes. Filling the slots 44 with the transparent insulation layer causes the light transmittance at the slots 44 to be consistent with or approximate to that of other positions, so that the difference in light transmittance will not be observable by a person's eyes, thereby improving the display effect.

The transparent insulation layer may be made of a silicon oxide, a silicon nitride or other transparent insulating materials, optical properties of which are preferably similar to those of the transparent conductive layer 403.

Various modifications and variations may be made by those skilled in the art without departing from the principle and scope of the invention. Thus, these modifications and variations are intended to be included in this invention.

What is claimed is:

1. A capacitive touch panel, comprising:
   a substrate;
   a black matrix formed on the substrate, wherein the black matrix comprises a plurality of light-permeable regions;
   a plurality of color units each aligned with one of the light-permeable regions of the black matrix in a light permeation direction, each of the color units comprising a color resistor of one of a plurality of colors; and
   at least one transparent conductive layer comprising a plurality of slots, wherein the slots of the transparent conductive layer are aligned with the color units of the same color in the light permeation direction.

2. The capacitive touch panel of claim 1, wherein the transparent conductive layer is located at an external or internal side of the substrate.

3. The capacitive touch panel of claim 1, wherein the black matrix is between the transparent conductive layer and the substrate.

4. The capacitive touch panel of claim 3, wherein, in the light permeation direction, a horizontal portion of the slots of the transparent conductive layer is overlapped with a light-impermeable region of the black matrix, and a vertical portion of the slots of the transparent conductive layer is overlapped with color resistors of the same color.

5. The capacitive touch panel of claim 4, wherein, a line width of the light-impermeable region of the black matrix in the horizontal direction ranges from 24.5 μm to 26.5 μm.

6. The capacitive touch panel of claim 4, wherein, a line width of the horizontal portion of the slots of the transparent conductive layer or of the horizontal slot is 10% to 90% of a line width of the light-impermeable region of the black matrix in the horizontal direction.

7. The capacitive touch panel of claim 6, wherein, the line width of the horizontal portion of the slots of the transparent conductive layer or of the horizontal slot ranges from 3 μm to 22 μm.

8. The capacitive touch panel of claim 4, wherein, the horizontal portion of the slots has the minimum line width equal to the width of one color unit, and has the maximum line width equal to the width of one color unit plus the line width of the light-impermeable region of the black matrix in a vertical direction on both sides of the color unit.

9. The capacitive touch panel of claim 8, wherein, the line width of the light-impermeable region of the black matrix in the vertical direction ranges from 7.0 μm to 8.0 μm.

10. The capacitive touch panel of claim 8, wherein, a line width of a vertical slot of the transparent conductive layer ranges from 33.5 μm to 38.5 μm.

11. The capacitive touch panel of claim 1, further comprising a metal grid layer which is electrically connected to the transparent conductive layer.

12. The capacitive touch panel of claim 1, comprising two transparent conductive layers, wherein each of slots is in the first transparent conductive layer.

13. The capacitive touch panel of claim 1, wherein, one or more slots are at the positions at the transparent conductive layer corresponding to the color units of the same color.

14. The capacitive touch panel of claim 1, wherein each of the slots comprises a transparent nonconductive material.

15. The capacitive touch panel of claim 1, wherein the color units include green units, which are not aligned with the slots of the transparent conductive layer in the light permeation direction.

16. A capacitive touch display device, comprising:
   a touch panel, comprising: a substrate,
   a black matrix formed on the substrate, wherein the black matrix comprises a plurality of light-permeable regions,
   a plurality of color units each aligned with one of the light-permeable regions of the black matrix in a light permeation direction, each of the color units comprising a color resistor of one of a plurality of colors, and
   at least one transparent conductive layer comprising a plurality of slots, wherein the slots of the transparent conductive layer are aligned with the color units of the same color in the light permeation direction;
   an array substrate, which is arranged opposite to the touch panel; and
   a display layer disposed between the touch panel and the array substrate.

17. The touch display device of claim 16, wherein the transparent conductive layer is located at an external or internal side of the substrate.

18. The touch display device of claim 16, wherein the black matrix is between the transparent conductive layer and the substrate.

19. The touch display device of claim 16, wherein the touch panel further comprises a metal grid layer which is electrically connected to the transparent conductive layer.

20. The touch display device of claim 16, wherein, the touch panel further comprises two transparent conductive layers, wherein each of slots is in the first transparent conductive layer.

* * * * *